United States Patent [19]

Deem

[11] 4,220,505

[45] Sep. 2, 1980

[54] SEPARATION OF HYDROGEN SULFIDE FROM FLUID STREAMS

[75] Inventor: Calvin K. Deem, Tulsa, Okla.

[73] Assignee: Combustion Engineering, Inc., Windsor, Conn.

[21] Appl. No.: 966,829

[22] Filed: Dec. 6, 1978

[51] Int. Cl.$^2$ .............................................. C25B 1/24
[52] U.S. Cl. ..................................... 204/94; 204/136; 208/241; 423/220; 423/224; 423/241; 423/573 R
[58] Field of Search ........... 423/220, 224, 241, 573 R; 208/241; 204/94, 136

[56] References Cited

U.S. PATENT DOCUMENTS

| 1,034,646 | 8/1912 | Rabenalt | 423/573 R |
|---|---|---|---|
| 1,847,795 | 3/1932 | Thorssell et al. | 423/573 R |
| 2,809,930 | 10/1957 | Miller | 204/136 |
| 3,401,101 | 9/1968 | Keller | 204/136 |
| 3,429,655 | 2/1969 | Case | 423/241 |
| 3,607,004 | 9/1971 | Deschamps | 423/573 R |
| 4,094,962 | 6/1978 | Cocuzza et al. | 423/573 R |

*Primary Examiner*—T. Tung
*Attorney, Agent, or Firm*—Arthur L. Wade

[57] ABSTRACT

A liquid solution containing a tri-halide from the halogen group consisting of bromine and iodine is passed in countercurrent flow with fluids containing sulfur compounds, including hydrogen sulfide, within a tower. The tri-halide solution removes selected sulfur compounds, including hydrogen sulfide, from the fluids and the halide solution is drained from the bottom of a tower for sulfur removal, electrolytic regeneration, and hydrogen release in order that a tri-halide from the electrolytic cell may be returned to the tower for continual removal of sulfur compounds, including hydrogen sulfide. A portion of the spent halide solution from the bottom of the tower is conducted to a point in the tower above the introduction of the tri-halide solution to prevent the loss of the diatomic halogen.

5 Claims, 1 Drawing Figure

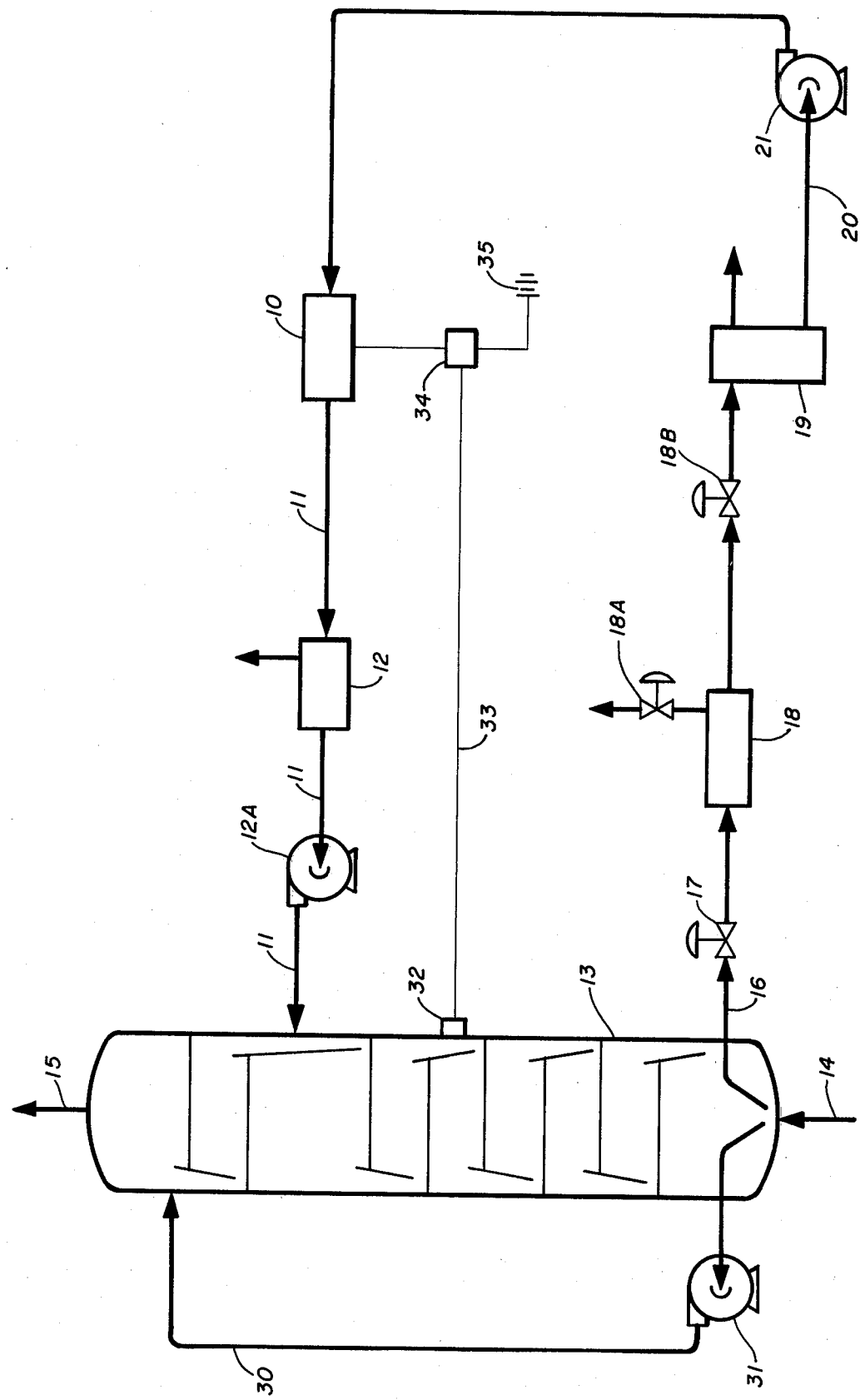

SEPARATION OF HYDROGEN SULFIDE FROM FLUID STREAMS

BACKGROUND OF THE INVENTION

1. Field of the Invention

The present invention relates to inhibiting the loss of the diatomic halogen associated with the tri-halide whose solution is flowed in contact with a fluid, from which is removed sulfur compounds, including hydrogen sulfide. More particularly, the invention relates to the use of a spent iodide solution from the bottom of a contact tower to that point in the upper portion of the tower where the vaporizing iodine would be swept by a treated fluid from the tower and thereby lost.

2. Description of the Prior Art

The disclosure of Keller U.S. Pat. No. 3,401,101 issued Sept. 10, 1968, is incorporated by reference into this present disclosure. The process disclosed is clearly designed to react a tri-halide with sulfur compounds, including hydrogen sulfide, in a vertical contact tower. Further, the disclosure shows reaction of the spent halide solution within an electrolytic cell. The regenerated tri-halide is then recirculated to the tower for continual hydrogen sulfide removal. The sulfur is precipitated and separated from the spent solution which solution is then recirculated to the electrolytic cell for regeneration.

A pilot plant was constructed under the teachings of the Keller patent. The fate, or ultimate disposition, of this plant is unknown. Keller went on to supervise the design of two plants while associated with Lacy Oil Tool Company. The first of these plants was installed for the Lomita Gas Company. The Lomit a unit operated for two years and was eventually replaced, because it was too small, by a plant embodying the Stretford process.

The second of these two plants was built near Bakersfield, California, for Superior Oil Company. It has survived with continual operation. The second plant was studied and found to have at least two problems in its operation. The first of the problems is in loss of the iodide charge of the system. The second problem is in the corrosion of the outlet conduit system from the contact zone.

In using potassium iodide, the Superior system introduces the complex compound of iodine and potassium iodide in the contact zone so it will flow downward in contact with the gas being treated as it flows upward. A portion of the iodine of the weakly bonded complex is swept into the discharge system of the treated gas. This loss of the iodine to the system is a significant operation cost.

Secondly, the iodine swept into the discharge system is significantly corrosive. The periodic replacement cost of the carbon steel conduit of the discharge system is an additive to the operation cost.

SUMMARY OF THE INVENTION

The present invention contemplates flowing spent halide solution to a point in the upper portion of the tower to absorb the volatile diatomic halogen of the reversible reaction of the tri-halide and control the reversible reaction of the tri-halide to inhibit the release of the diatomic halogen.

The present invention further contemplates the use of a solution of potassium tri-iodide to contact gases containing sulfur compounds, including hydrogen sulfide. The resulting potassium iodide is routed to absorb volatile iodine released above the zone of contact between potassium tri-iodide and hydrogen sulfide and to control the release of iodine.

Other objects, advantages and features of this invention will become apparent to one skilled in the art upon consideration of the written specification, appended claims and attached drawings.

BRIEF DESCRIPTION OF THE DRAWING

The single FIGURE of drawing is a diagrammatic representation of the system for removing sulfur compounds from a gaseous stream and incorporating the present invention.

DESCRIPTION OF THE PREFERRED EMBODIMENT

General:

Because of the incorporation of the disclosure of U.S. Pat. No. 3,401,101 by reference, there are many details of the drawing which may be dealt with summarily. For example, the electrolytic cell is exhaustively described in the incorporated disclosure. The function of the cell need only be recognized here in its consumption of electrical energy. The cell functions to convert the solution from a lower oxidizing state to a higher oxidizing state. More specifically, in the present disclosure, a selection of a halide for the preferred embodiment results in the halide being converted, in the cell, to a tri-halide and becoming in the oxidation process, a mono-halide of a lower oxidizing state.

A solution containing the tri-halide is flowed from the electrolytic cell in countercurrent flow with fluid to be treated. Preferably, a vertical tower is employed for this contact between fluids. A portion of the spent, or mono-halide, is flowed from the lower portion of the contact tower and the elemental sulfur removed from the solution preparatory to the reconversion of the solution in the electrolytic cell. Thus, the system and process of the present drawings are comparable to the incorporated disclosure.

The present disclosure is initiated with a more specific consideration of electrolytic cell 10. The oxidizing material produced by the electric power to cell 10 is passed in countercurrent flow to fluids containing sulfur compounds to be oxidized.

The countercurrent flow contact is carried out in vertical tower 13. The spent solution is accumulated in the bottom of tower 13 and cycled back to electrolytic cell 10 for regeneration. During recirculation, the elemental sulfur resulting from the oxidation process in tower 13 is mechanically removed from the cycle in flotation cell 19. This is a very simple, continuous cycle. If efficient, the cycle can operate with a minimum loss of its oxidizing material. If the proper oxidation substance is selected and the flow rates are correctly designed, the fluids flowing through contact tower 13 will have their sulfur compounds stripped from them, down to a satisfactory minimum, and discharged from the process through conduit 15.

In reality, the halides in solution brought to their higher state of oxidation by cell 10 are in a reversible reaction. The volatile diatomic halogen can be released from the solution if the reversible reaction $$MX_3 \rightleftharpoons MX + X_2 \uparrow$$

is shifted to the right. Thus, in the oxidation process, not all of the halide in its higher state is available for oxidation of the sulfur compounds. For example, with a halide of potassium iodide, iodine will vaporize to some significant degree and be swept from tower 13 by the fluids which have been processed in tower 13. Iodine is quite volatile and will readily corrode carbon steel. The escape of economically valuable iodine is one problem. The corrosion of the outlet system of tower 13 is a second problem. The present invention captures this vaporizing iodine and shifts the reversible reaction to the left to inhibit the release of volatile iodine.

Compatible with the incorporated disclosure, electrolytic cell 10 is depicted as producing its output solution into conduit 11. Surge tank 12 is disclosed in conduit 11 to provide for venting gases generated by the cell. Downstream of surge tank 12 in conduit 11 is pump 12-A. It is this pump 12-A which delivers the tri-halide solution from the surge tank 12 to the upper portion of vertical tower 13 at the highest pressure of the system. This pressure is greater than that within tower 13 to flow the tri-halide solution into tower 13.

The construction of contact tower 13 is conventional, having been described adequately in the incorporated disclosure. A series of horizontal trays are mounted therein down which the solution of output cell 10 is flowed in its contact with the sulfur compound-containing gas flowed upwardly.

Gaseous fluid, containing sulfur compounds and hydrogen sulfide, are flowed up through tower 13. A source of such gases is connected to conduit 14 which is connected as an input to the lower portion of tower 13. After contact with the treating fluid, which removes selected sulfur compounds, the treated gaseous fluid is conducted from the upper portion of tower 13 and through conduit 15.

The spent treating fluid, specifically a solution containing the mono-halide, is collected in the lower portion of tower 13 to be flowed therefrom through conduit 16.

Output conduit 16 has a valve 17 mounted therein across which any superatmospheric pressure of tower 13 is reduced. This pressure reduction on the treating solution is necessary for the ready removal of elemental sulfur in downstream separation apparatus. The separation apparatus may consist of a separator vessel 18 and a gas flotation cell 19. The flotation cell 19 may require close adjustment of the amount of gas evolved to efficiently flotate the elemental sulfur to be removed. The separator vessel 18 forms a structure from which a portion of the gas may be evolved prior to evolvement in the flotation process. Final adjustment of the gas to be evolved in vessel 19 may be regulated by the adjustment of valve 18-A in the gas outlet of separator vessel 18. Further, valve 18-B in the connection between separator 18 and cell 19 is regulated to maintain the liquid level in separator 18 and give the final pressure drop to atmosphere in cell 19. Of course, from vessel 19, the solution remaining after sulfur removal is returned to cell 10 by way of conduit 20. Motive power is supplied by pump 21.

The unfortunate situation with the system disclosed in this application and the incorporated patent disclosure is that the tri-halides from cell 10 are in a reversible reaction in their solution and the volatile diatomic halogen will be released from the solution when the reversible reaction is driven in that direction. With the reversible reaction releasing vaporizable diatomic halogen in the upper portion of tower 13, the diatomic halogen will be swept from the process with the treated gas flowing out of conduit 15.

The present invention contemplates absorbing the volatile diatomic halogen with a solution and keeping them cycled in the process by passing down tower 13. This absorbing material is introduced into the top of tower 13 at that point in the process which follows contact between the up-flowing gas being treated and the down-flowing solution from cell 10.

The present invention was reduced to practice by the use of potassium iodide as the halide of the process. The electrolytic cell 10 converted the potassium iodide to potassium tri-iodide and this compound was the effective oxidizing agent introduced into tower 13 to treat the sulfur-containing gases. As generalized, reversibility of the reaction of the potassium tri-iodide in solution causes the release of some of the volatile iodine unless strongly driven to the left. The volatile iodine is not absorbed readily in water but is absorbed readily in a solution of potassium iodide. The answer to the problem was to transport a solution of potassium iodide to the upper portion of vertical tower 13 to absorb the volatile iodine.

Fortunately, a solution of potassium iodide is readily available from the lower portion of tower 13 to the entrance of cell 10. The more convenient point of withdrawal is at the lower portion of tower 13 itself.

Conduit 30 is shown as a conduit from the lower portion of tower 13 to that upper portion of tower 13 where the solution of potassium iodide will most effectively absorb the volatile iodine from the reversible reaction and shift the reversible reaction to the left.

Control:

All of the fluids moved through the system disclosed are supplied power for movement by various pumps. The gas being treated is applied through conduit 14 at a pressure which may or may not be supplied by a pump. In any event, the source of the pressure of this gas is not disclosed. The pressure may be the native pressure of production or that of a pump; it does not matter. It is generally assumed that the pressure within tower 13 is substantially above atmospheric.

Valve 17 has been disclosed as reducing the pressure toward that value at which sulfur removal may be readily carried out from the spent solution drawn from the lower portion of tower 13. The pressure of this solution stream is then increased to that value selected for the operation of cell 10. From cell 10, pump 12-A again increases the pressure to the value needed to inject the solution out of cell 10 into tower 13.

Valve 17 can and may well be controlled from a liquid level sensing devise responsive to the level of the spent solution collected in the lower portion of tower 13. All of these arrangements for circulating the fluids of the system, reducing their pressure, and elevating their pressure are the conventional manipulation necessary for the fluid mechanics of the system.

The delivery of the absorbing solution to the upper portion of tower 13 is disclosed as through conduit 30. Obviously, a pump, or equivalent, must be supplied to pick up the spent solution in the system between tower 13 and the entrance to pump 21 for delivery to the upper portion of tower 13. Pump 31 is disclosed in conduit 30 for this purpose.

Another element of control relates to cell 10. The electric power to cell 10 may be varied to obtain the desired concentration of the higher state of treating material supplied to the sulfur removal process of tower 13. Therefore, a colorimeter 32 is connected to respond to the concentration of treating material within tower 13 and develop a signal on line 33 which will adjust regulator 34 in varying the power from source 35 applied to cell 10. The novelty in the arrangement is the discovery of the point in the process which can be sensed to vary the power applied to cell 10 to maintain the process at its predetermined set point. The mechanics of carrying out this control are straight forward.

SCOPE OF THE INVENTION

Although the preferred embodiment of the invention utilizes potassium iodide to combine with selected sulfur compounds of the treated fluid, it should be understood that any of the halides selected from the group consisting of potassium, bromide, sodium iodide, and sodium bromide will also be satisfactory under the concepts of the invention.

The solution in which these halides are included may contain varying amounts of water and one of the glycols. This treating solution is passed through the cell 10 with the object of converting the halides to tri-halides which will combine with the sulfur compounds in the treated gas. All of this is clearly set forth in the Keller patent which is incorporated by reference.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

The invention having been described, what is claimed is:

1. The process for the removal of sulfur compounds which include hydrogen sulfide from fluid to be treated, comprising, selecting a halide from a group consisting of potassium iodide and potassium bromide and sodium iodide and sodium bromide, forming an aqueous solution of the selected halide, subjecting the aqueous solution to an electrolyzing current to form a tri-halide, contacting a fluid containing sulfur compounds which include hydrogen sulfide with the solution containing the tri-halide to convert the sulfur compounds to elemental sulfur and to return the tri-halide to the original mono-halide state, and passing solution containing the halide in the original state to that point in the process which follows the contact of the fluid containing the sulfur compounds and the tri-halide solution to absorb the volatile diatomic halogen which vaporizes from the reversible reaction of tri-halide decomposition and passing the absorbing solution of halide and recombined diatomic halogen into the halide solution prior to its subjection to the electrolyzing current.

2. The process of claim 1, in which, the contact of the fluid-containing sulfur compounds and the tri-halide is made under pressure significantly above atmospheric, the solution containing the elemental sulfur and halides in the original state has its pressure reduced, and elemental sulfur is separated from the solution containing the halide in the original state.

3. The process of claim 2, in which, the separation is made by flotation of the elemental sulfur with gas released from the solution.

4. The process of claim 3, in which, the gases generated by subjecting the solution to the electrolyzing current are vented prior to contact between the solution containing the tri-halide and the fluid containing the sulfur compounds.

5. The process of claim 1, in which, the halide is potassium iodide and the diatomic halogen is iodine.

* * * * *